United States Patent [19]
Yamauchi et al.

[11] Patent Number: 5,761,190
[45] Date of Patent: Jun. 2, 1998

[54] OFDM BROADCAST WAVE RECEIVER

[75] Inventors: Keiichi Yamauchi; Hidemi Usuba, both of Tsurugashima, Japan

[73] Assignee: Pioneer Electronic Corporation, Tokyo, Japan

[21] Appl. No.: 602,602

[22] Filed: Feb. 16, 1996

[30] Foreign Application Priority Data

| Feb. 20, 1995 | [JP] | Japan | 7-031253 |
| Feb. 20, 1995 | [JP] | Japan | 7-031254 |
| Feb. 20, 1995 | [JP] | Japan | 7-031255 |
| Feb. 21, 1995 | [JP] | Japan | 7-031999 |

[51] Int. Cl.$^6$ ............................................. H04J 11/00
[52] U.S. Cl. ............................................. 370/210; 375/362
[58] Field of Search .................................... 370/206, 207, 370/208, 210, 212–213, 468, 211, 203, 204, 209; 375/260, 362, 326, 344, 281, 283, 327, 335, 320, 334; 455/42, 502, 77, 85, 86, 87

[56] References Cited

U.S. PATENT DOCUMENTS

| 5,444,694 | 8/1995 | Leung et al. | 370/270 |
| 5,506,836 | 4/1996 | Ikeda et al. | 370/203 |
| 5,550,812 | 8/1996 | Philips | 370/203 |

*Primary Examiner*—Dang Ton
*Attorney, Agent, or Firm*—Morgan, Lewis & Bockius LLP

[57] ABSTRACT

An OFDM (Orthogonal Frequency Division Multiplex) broadcast wave receiver for receiving an OFDM broadcast wave, automatically discriminating whether the received signal is of a wide band or a narrow band by determining if a carrier signal having a predetermined frequency is present among signals of a plurality of frequencies, acquired by OFDM demodulation of the reception signal by demodulation means, and controlling the demodulating operation of the demodulation means in accordance with the discrimination result to thereby acquire a demodulated signal.

20 Claims, 15 Drawing Sheets

OFDM BROADCAST WAVE RECEIVER

BACKGROUND OF THE INVENTION

1. Field of the Invention

The present invention relates to an OFDM (Orthogonal Frequency Division Multiplex) broadcast wave receiver.

2. Description of the Related Background Art

It is known that OFDM is appropriate as a modulation system to be employed in digital audio broadcasting (hereinafter called "DAB"). OFDM is a multicarrier modulation system which uses multiple carriers (subcarriers), which are orthogonal to one another. The OFDM is therefore advantageous in maximizing the frequency use efficiency.

In an OFDM type of DAB system, on the transmitter side, input data is converted by a serial-parallel converter to parallel data which in turn is converted to a π/4 shift QPSK symbol by a differential coder. This symbol is modulated by an inverse fast Fourier transformer (IFFT) to yield the in-phase component and orthogonal component of a base-band signal. The individual outputs of the IFFT are subjected to D/A conversion first and are then subjected to orthogonal modulation with an oscillation signal from a local oscillator. The resultant signals are then converted to a transmission signal having a desired frequency, which is in turn transmitted from an antenna. On the receiver side, the reverse operation to the operation on the transmitter side is performed. More specifically, the signal received by the antenna is converted to an intermediate frequency signal from which the in-phase component and orthogonal component of the base-band signal are extracted by an orthogonal demodulator. The output signals of the orthogonal demodulator are digitized by an A/D converter, and the resultant digital signals are subjected to Fourier transform by a fast Fourier transformer (FFT). This Fourier transform yields signals for individual carriers, which are subjected to differential decoding, carrier by carrier, by a differential decoder. The output signal of the differential decoder is converted to serial data as received data by a parallel-serial converter. Actually, this serial data undergoes data processing such as error correction after which the resultant data is converted to an analog signal.

To establish practical use of the DAB, it has been considered in Europe to set the transmission band width used in the DAB to 1.536 MHz and to change the number of carriers in accordance with a transmission mode. For example, 1536 carriers are used in mode 1. Because of the use of such wide-band signals, introduction of this OFDM type of DAB system is difficult in countries where sufficient empty frequency bands are not available. In this respect, a DAB system which uses signals of narrower bands is desired. Therefore, there is possibility that wide-band transmission signals and narrow-band transmission signals coexist, so that the receiver side should discriminate whether the received signals is of a wide band or a narrow band at the time of reception.

SUMMARY OF THE INVENTION

Accordingly, it is a primary objective of the present invention to provide an OFDM broadcast wave receiver which can automatically discriminate whether the received signal is of a wide band or a narrow band at the time of reception.

An OFDM broadcast wave receiver according to the first aspect of the present invention comprises tuning means for selecting a signal having a desired frequency as a reception signal from high frequency signals from an antenna; demodulation means for performing OFDM demodulation on the reception signal to acquire signals each of which has one of a plurality of frequencies; band detection means for detecting a band width of the reception signal and generating a band detection signal indicative of the band width; and control means for controlling a demodulation operation of the demodulation means in accordance with the band detection signal, wherein the band detection means discriminates if there is a carrier signal with a predetermined frequency among the plurality of frequencies and outputs the discrimination result as the band detection signal.

According to the first aspect, it is determined if a carrier signal having the predetermined frequency is present among signals each of which has one of the plurality of frequencies, acquired by OFDM demodulation of the reception signal by the demodulation means, and the demodulating operation of the demodulation means is controlled in accordance with the discrimination result.

According to the second aspect of the present invention, there is provided an OFDM broadcast wave receiver for receiving a broadcast wave, acquired by performing OFDM modulation on a data signal and transmitted as a signal having a null portion for each frame, which receiver comprises tuning means for selecting a signal having a desired frequency as a reception signal from high frequency signals from an antenna; demodulation means for performing OFDM demodulation on the reception signal to acquire signals each of which has one of a plurality of frequencies; band detection means for detecting a band width of the reception signal and generating a band detection signal indicative of the band width; and control means for controlling a demodulation operation of the demodulation means in accordance with the band detection signal, wherein the band detection means discriminates if a carrier signal having a specific frequency is present in the null portion of the reception signal and outputs the discrimination result as the band detection signal.

According to the second aspect, since a broadcast wave is acquired by performing OFDM modulation on a data signal and is transmitted as a signal which has a null portion for each frame, a carrier signal having a specific frequency indicative of the band width of the broadcast wave has been inserted in the null portion before transmission, and the receiver discriminates if the carrier signal having the specific frequency is present in the null portion of the reception signal and controls the demodulating operation of the demodulation means in accordance with the discrimination result.

According to the third aspect of the present invention, there is provided an OFDM broadcast wave receiver for receiving a broadcast wave, acquired by performing OFDM modulation on a data signal and transmitted as a frame-by-frame signal, which receiver comprises tuning means for selecting a signal having a desired frequency as a reception signal from high frequency signals from an antenna; demodulation means for performing OFDM demodulation on the reception signal to acquire signals each of which has one of a plurality of frequencies; band detection means for detecting a band width of the reception signal and generating a band detection signal indicative of the band width; and control means for controlling a demodulation operation of the demodulation means in accordance with the band detection signal, whereby the band detection means discriminates a frame length of the reception signal and outputs the discrimination result as the band detection signal.

According to the third aspect, since a broadcast wave is transmitted as a frame-by-frame signal which is acquired by performing OFDM modulation on a data signal and the frame length of the reception signal differs according to the band width of the broadcast wave, the receiver discriminates the frame length of the received signal and controls the demodulating operation of the demodulation means in accordance with the discrimination result.

According to the fourth aspect of the present invention, there is provided an OFDM broadcast wave receiver for receiving a broadcast wave, acquired by performing OFDM modulation on a, data signal and transmitted as a signal having a reference signal for differential demodulation for each frame, which receiver comprises tuning means for selecting a signal having a desired frequency as a reception signal from high frequency signals from an antenna; demodulation means for performing OFDM demodulation on the reception signal to acquire signals each of which has one of a plurality of frequencies; identification parameter detection means for detecting a predetermined identification parameter about the broadcast wave and generating an identification detection signal indicative of a content of the predetermined identification parameter; and control means for controlling a demodulation operation of the demodulation means in accordance with the identification detection signal, the identification parameter detection means including means for extracting a signal corresponding to the reference signal from an output signal of the demodulation means, and discrimination means for discriminating if the extracted signal is a signal indicative of a specific content in the predetermined identification parameter and outputting the discrimination result as the identification detection signal.

According to the fourth aspect, since a broadcast wave is acquired by performing OFDM modulation on a data signal and is transmitted as a signal having a reference signal for differential demodulation for each frame, a predetermined identification parameter about the band width or the like of the broadcast wave is described in the reference signal in a detectable form, and the receiver extracts a signal corresponding to the reference signal and to be subjected to OFDM demodulation from the output signal of the demodulation means, discriminates if the extracted signal is a signal indicative of a specific content in the predetermined identification parameter and controls the demodulating operation of the demodulation means in accordance with the discrimination result.

DETAILED DESCRIPTION OF THE PREFERRED EMBODIMENTS

Preferred embodiments of the present invention will be described below in detail with reference to the accompanying drawings.

Figure 1:
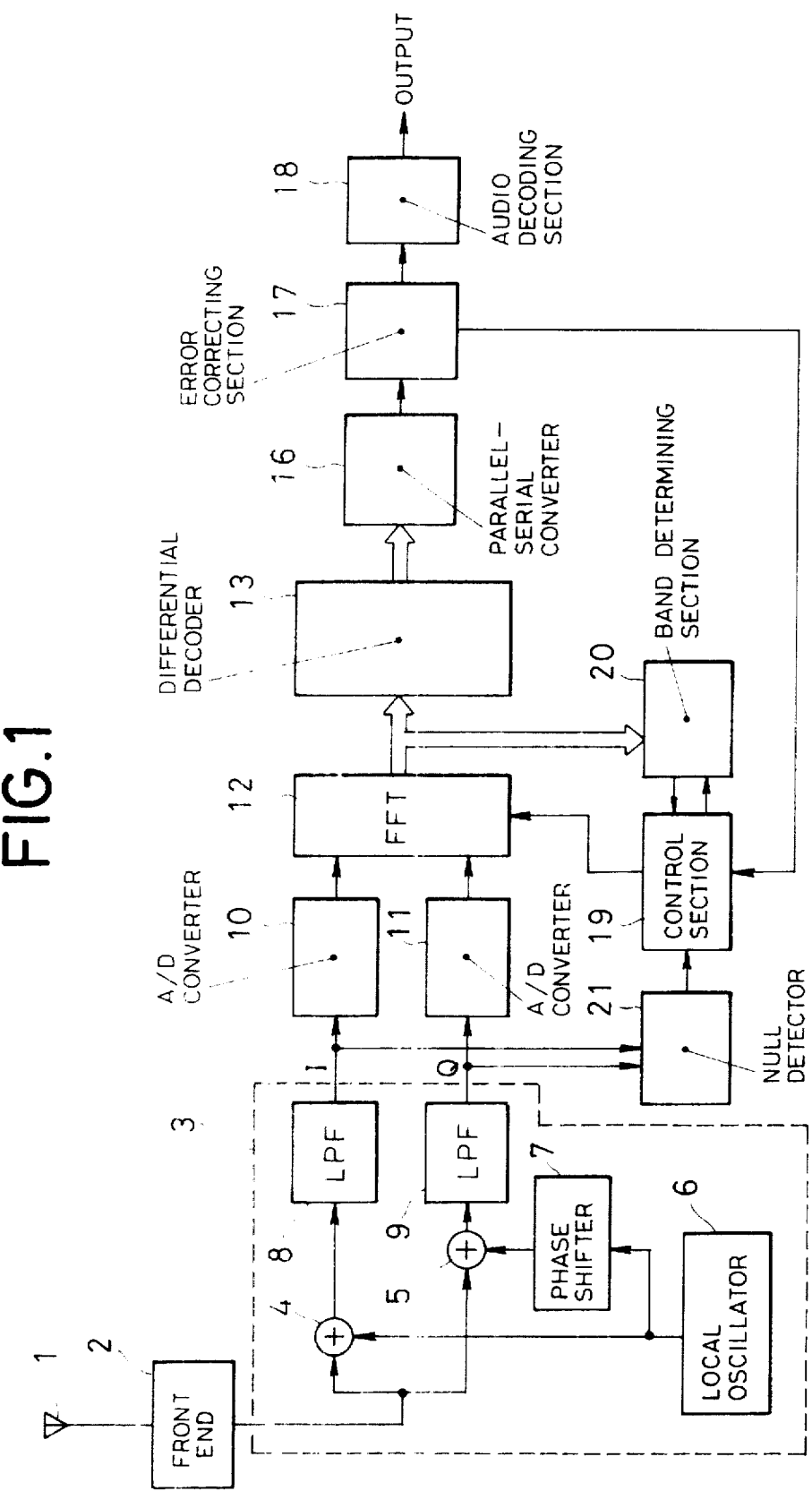
FIG. 1 is a block diagram showing an embodiment of the present invention.

FIG. 1 shows an OFDM broadcast wave receiver according to one embodiment of the present invention. In this receiver, an RF (Radio Frequency) signal from an antenna 1 is supplied to a front end 2 as tuning means where a desired frequency signal included in the RF signal is converted to an intermediate frequency signal. The intermediate frequency signal is then supplied to an orthogonal demodulator 3. The orthogonal demodulator 3 comprises two mixers 4 and 5, a local oscillator 6, a phase shifter 7 and LPFs (Low Pass Filters) 8 and 9. The mixer 4 mixes an oscillation signal output from the local oscillator 6 with the intermediate frequency signal and outputs an in-phase component signal I of a base-band signal. The in-phase component signal I is output from the orthogonal demodulator 3 via the LPF 8. The phase of the oscillation signal from the local oscillator 6 is shifted by 90 degrees by the phase shifter 7, and the phase-shifted oscillation signal is supplied to the mixer 5. The mixer 5 mixes the oscillation signal from the phase shifter 7 with the intermediate frequency signal and outputs an orthogonal component signal Q of the base-band signal. The orthogonal component signal Q is output from the orthogonal demodulator 3 via the LPF 9.

A/D converters 10 and 11 are connected to the output of the orthogonal demodulator 3. The A/D converter 10 converts the in-phase component signal I passed through the LPF 8 to a digital signal, and the A/D converter 11 converts the orthogonal component signal Q passed through the LPF 9 to a digital signal. The sampling frequencies of the A/D converters 10 and 11 are 2.048 MHz. An FFT (Fast Fourier Transformer) 12 is connected to the outputs of the A/D converters 10 and 11. The FFT 12 transforms the digital signal on the time axis to a signal on the frequency axis by fast Fourier transform, and outputs the result of transformation of the number of carriers (n carriers) according to a control signal from a control section 19 to be discussed later, or carrier phase information ($i_n$, $q_n$) to a differential decoder 13.

The differential decoder 13 executes differential decoding based on phase information relating to the n carriers to be input. The differential decoding multiplies the conjugate complex of previous phase information to be input and current phase information by each other, carrier by carrier, to acquire the phase difference between the previous phase information and the current phase information. Each differential decoded output is converted to serial data by a parallel-serial converter 16. An audio decoding section 18 is connected via an error correcting section 17 to the output of the parallel-serial converter 16. The error correcting section 17 executes deinterleaving and Viterbi decoding. Accordingly, the serial data is subjected to error correction in the error correcting section 17 and then is subjected to audio coding to obtain PCM digital audio data.

A null detector 21 is connected to the outputs of the LPFs 8 and 9. The null detector 21 detects a null portion in one frame of data signals in accordance with the in-phase component signal I and orthogonal component signal Q obtained from the LPFs 8 and 9. The control section 19 is connected to the detection output of the null detector 21.

The FFT 12 outputs the result of the carrier transformation, needed in a band determining section 20, to the band determining section 20. The band determining section 20 is provided to determine whether the received signal is a narrow-band signal or a wide-band signal. When the input transformation result is determined as $i^2+q^2$>specified value, for example, the band determining section 2 detects the presence of a carrier and supplies the detection result to the control section 19. The control section 19 controls the operation of the FFT 12 by its operation to be discussed later, in accordance with the null detection signal from the null detector 21 and the output signal of the band determining section 20. The control section 19 is supplied with an error ratio by the error correcting section 17 in an error correction mode. The control section 19 and the band determining section 20 are constituted of a microcomputer, and operate in synchronism with the sampling timing of the A/D converters 10 and 11.

Figure 2:
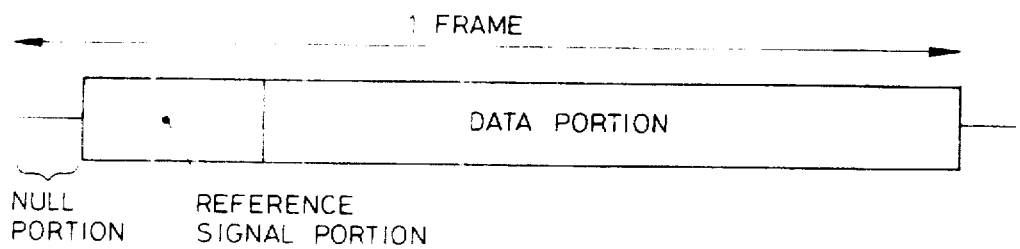
FIG. 2 is a diagram showing the format of a transmission signal.

Signals to be transmitted from a broadcasting station have a format shown in FIG. 2 that, for each frame, has a null portion at the head where no signals are present and which is provided for synchronization, followed by a reference signal portion as a phase reference for differential decoding, and a data portion.

Figure 3:
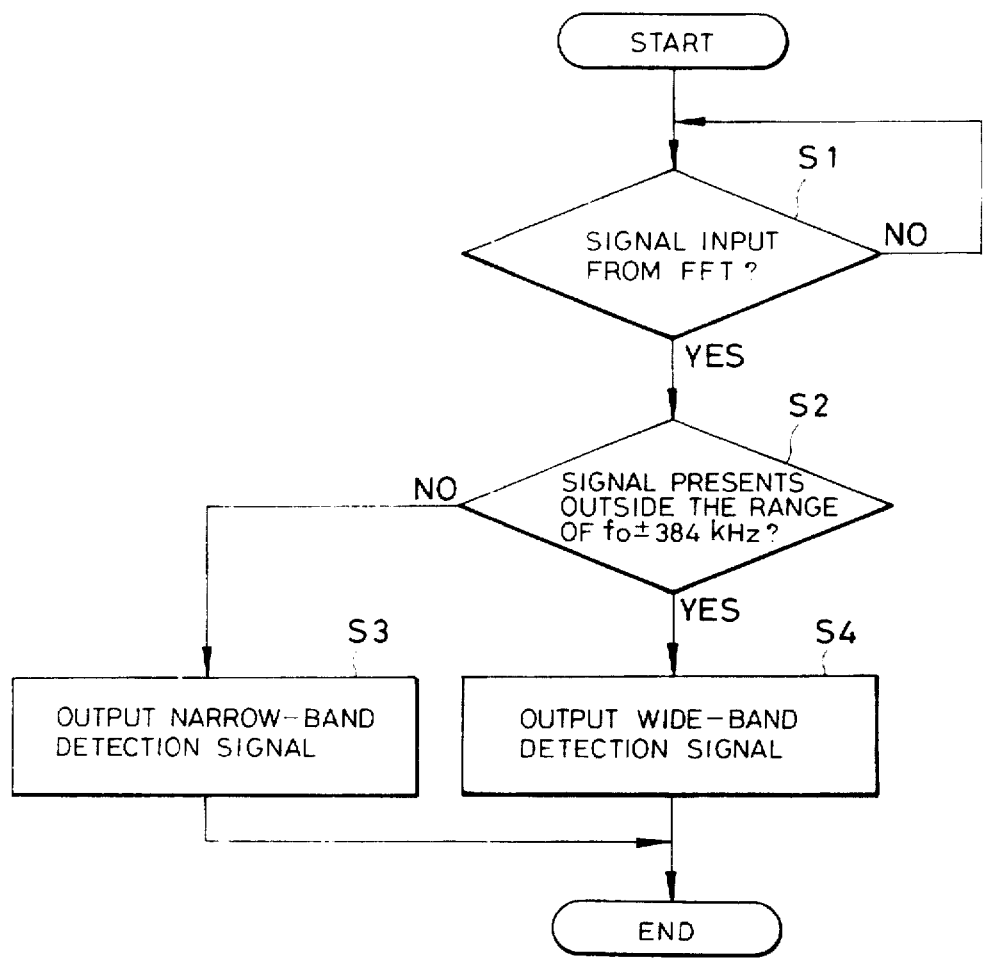
FIG. 3 is a flowchart illustrating the operation of a band determining section.
Figure 4:
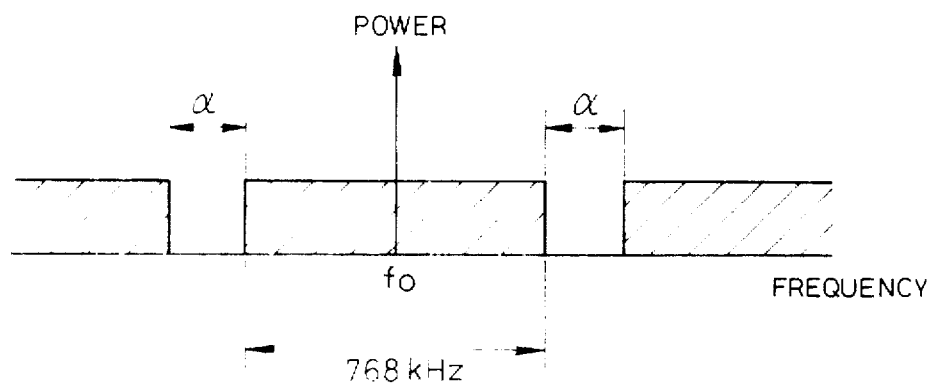
FIG. 4 is a diagram showing the band width of a narrow-band signal.
Figure 5:
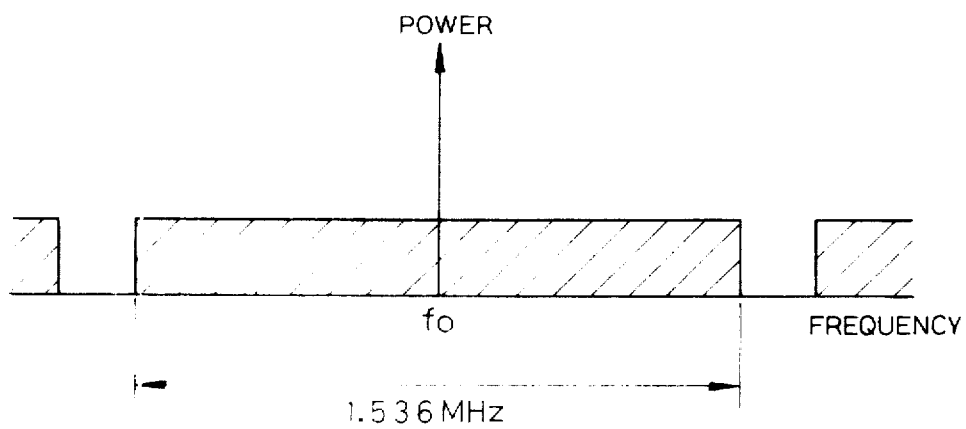
FIG. 5 is a diagram showing the band width of a wide-band signal.

As shown in FIG. 3, the band determining section 20 discriminates if there is a signal input from the FFT 12 (step S1). When there is a signal input, which means the presence of a received signal, the band determining section 20 discriminates if there is a carrier signal having a frequency which is other than the range of ±384 KHz from the center frequency $f_o$ (step S2). That is, when the transmission signal is of a narrow band, it has a band width of 768 KHz, as shown in FIG. 4, and each carrier signal has a frequency within the range of ±384 KHz from the center frequency $f_o$, so that there are no signals, except noise, in a guard band a between the band of one signal to be received and the adjoining signal band. When the transmission signal is of a wide band, it has a band width of 1.536 MHz, as shown in FIG. 5, so that there are carrier signals even outside the range of ±384 KHz. Therefore, the band determining section 20 discriminate the presence or absence of carrier signals in those among a plurality of signal lines from the FFT 12, which are outside the range of ±384 KHz, i.e., the presence or absence of carrier signals in those carrier-signal outputting lines in the guard band a in FIG. 4. When there are no carrier signals outside the range of ±384 KHz, the band determining section 20 outputs a narrow-band detection signal (step S3). When there are carrier signals outside the range of ±384 KHz, the band determining section 20 outputs a wide-band detection signal (step S4). The output signal of the band determining section 20 is held in holding means such as a buffer to be used by the control section 19.

The null detector 21 detects the null portion shown in FIG. 2 from the envelope of the reception signal. More specifically, the null detector 21 computes $I^2+Q^2$ from an in-phase component signal I and an orthogonal component signal Q, acquired from the LPFs 8 and 9, and generates a null detection signal to represent the time of the detection of the null portion when $I^2+Q^2$ is equal to or smaller than a reference value. This null detection signal is supplied to the control section 19.

Figure 6:
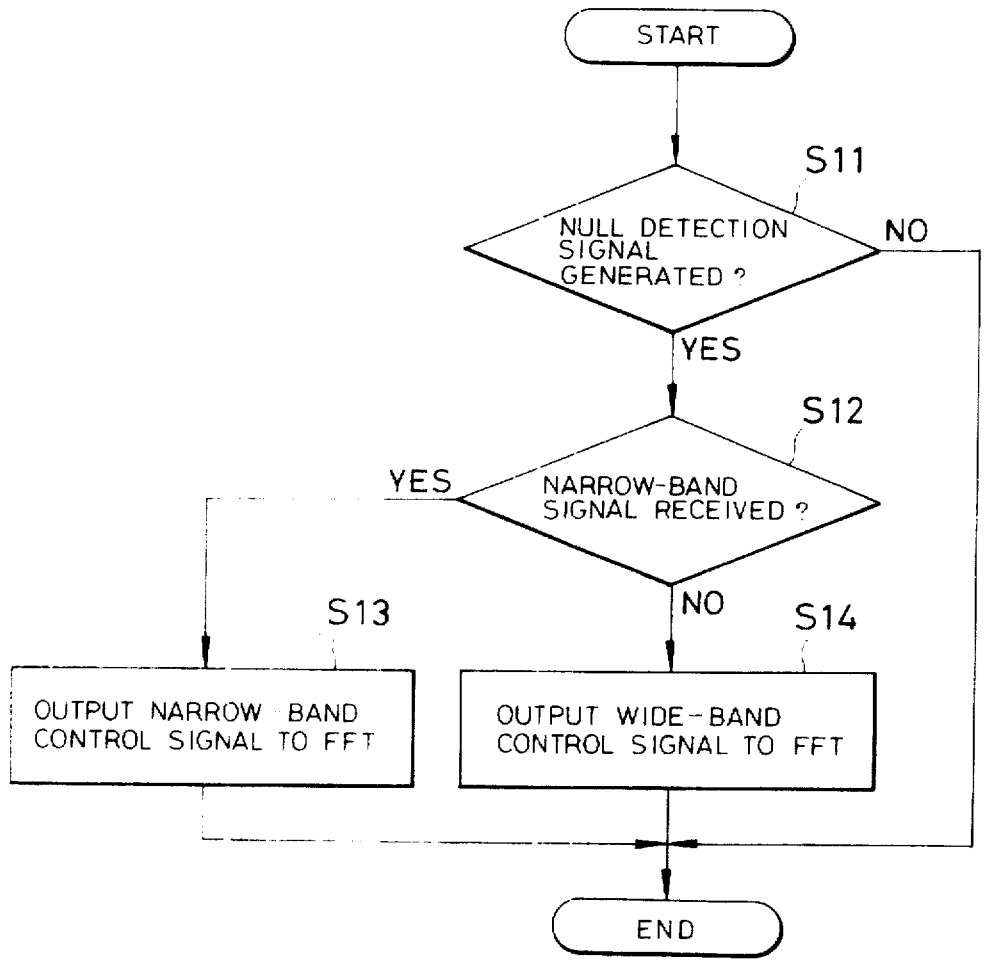
FIG. 6 is a flowchart illustrating the operation of a control section.

The control section 19 discriminates the presence of the null detection signal (step S11), and discriminates if the reception signal is a narrow-band signal when the null detection signal exists (step S12), as shown in FIG. 6. This discrimination is determined from the output of the band determining section 20. When the narrow-band detection signal is supplied from the band determining section 20, therefore, the control section 19 outputs a narrow-band control signal to the FFT 12 (step S13). When the wide-band detection signal is supplied from the band determining section 20, which means that the reception signal is not a narrow-band signal, the control section 19 outputs a wide-band control signal to the FFT 12 (step S14).

Figure 7:
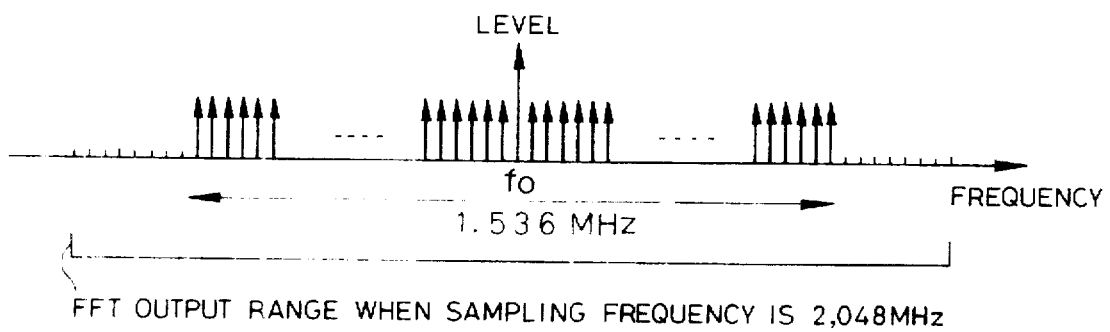
FIG. 7 is a diagram showing the spectrum of a wide-band signal.

The FFT 12 normally operates to cope with a wide-band signal. In synchronism with the null detection signal, therefore, the control section 19 sends the wide-band control signal to the FFT 12. By setting the sampling frequency to 2.048 MHz, for example, the FFT 12 provides an FFT result including a wide-band signal having the band width of 1.536 MHz, as shown in FIG. 7, and outputs the FFT result concerning the band width of 1.536 MHz to the differential decoder 13.

When the narrow-band control signal is supplied to the FFT 12, on the other hand, an FFT result includes a narrow-band signal having the band width of 768 KHz, so that the FFT 12 switches the output format to send the FFT result concerning the band width of 768 KHz to the differential decoder 13.

Regardless of whether the reception signal is a wide-band signal or a narrow-band signal, an FFT result in the guard band a is output to the band determining section 20.

Figure 8:
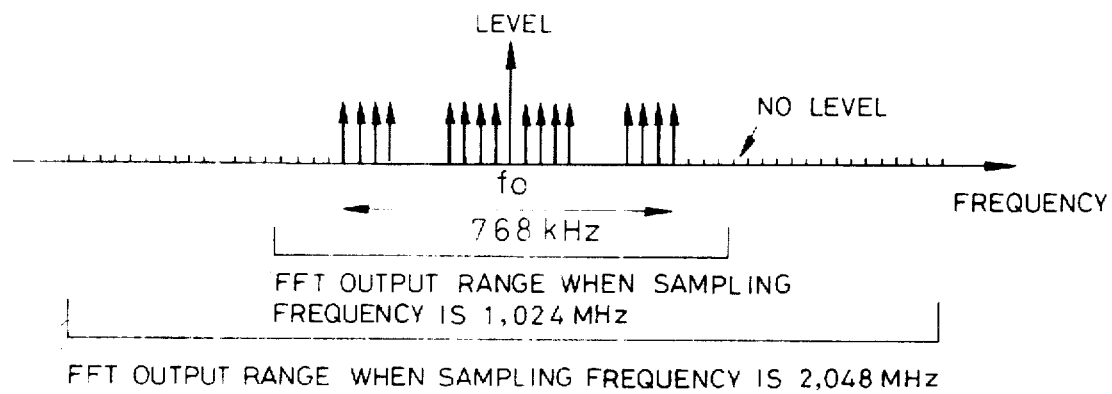
FIG. 8 is a diagram showing the spectrum of a narrow-band signal.

The sampling frequency may be changed in accordance with the band control signal. If the FFT 12 changes the sampling frequency to 1.024 MHz, a half of 2.048 MHz mentioned above, when the narrow-band control signal is supplied to the FFT 12, the FFT result includes the band width of 768 KHz around the center frequency $f_o$ as shown in FIG. 8. The FFT 12 can therefore output the FFT result concerning the band width of 768 KHz to the differential decoder 13. By changing the sampling frequency in accordance with the band control signal, FFT for unnecessary bands can be avoided, thus relieving the FFT load. In this case too, regardless of whether the reception signal is a wide-band signal or a narrow-band signal, the FFT result in the guard band a is output to the band determining section 20.

Figure 9:
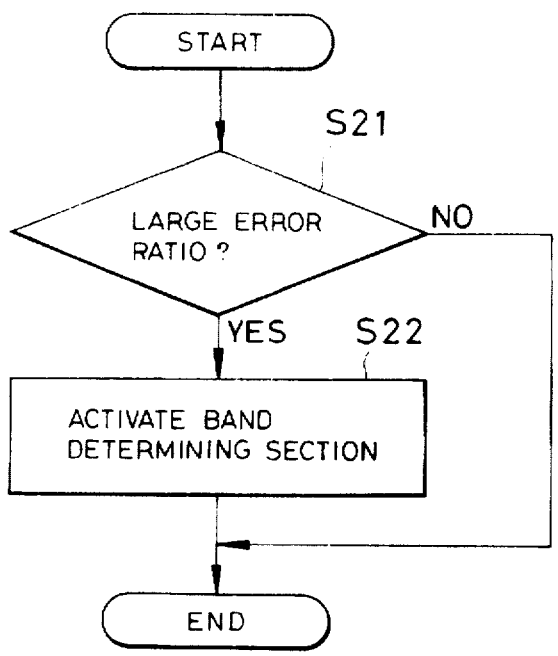
FIG. 9 is a flowchart illustrating the operation of the control section.

The band determining section 20 need not always execute the above-described band discriminating operation, but may start the operation in response to an instruction from the control section 19. For example, the control section 19 determines if an error ratio supplied from the error correcting section 17 is greater than a predetermined value (step S21) at a given timing and activates the band determining section 20 when the error ratio is greater than the predetermined value (step S22), as shown in FIG. 9. In response to this activation instruction, the band determining section 20 executes the operation illustrated in FIG. 3. In other words, it is assumed that when the error ratio of data acquired in the error correcting section 17 becomes greater than the predetermined value, it is because the processing so far has been carried out, considering that the reception signal were a wide-band signal, even though it was a narrow-band signal. To make this checking, the band determining section 20 determines the band width of the reception signal. In this way, when a microcomputer is used to constitute the control section 19 and the band determining section 20 as mentioned above, the load of the microcomputer can be reduced since the band determining section 20 need not always execute the operation.

Although the wide band width is set to 1.536 MHz and the narrow band width is set to 768 KHz in the first embodiment, the band widths are not limited to those particular values, and may be set in accordance with the number of carriers. This also applies to other embodiments which will be discussed later.

Since it is previously known from which one of the individual channel outputs of the FFT 12 a signal whose frequency is outside the range of ±384 KHz around the center frequency $f_o$ is output in the first embodiment, the presence or absence of such a signal is detected by determining if a carrier signal is present in that output. Instead of this approach, frequency signal detection means such as a band-pass filter may actually be used to detect the presence or absence of a signal whose frequency is outside the range of ±384 KHz around the center frequency $f_o$.

According to the OFDM broadcast wave receiver of this embodiment, it is determined if a carrier signal of a predetermined frequency is present among signals each of which has one of a plurality of different frequencies, acquired by OFDM demodulation of the reception signal by the demodulation means, and the demodulating operation of the demodulation means is controlled in accordance with the discrimination result. It is therefore possible to automatically determine whether the received signal is a wide-band signal or a narrow-band signal, thus ensuring the proper signal reception.

Figure 10:
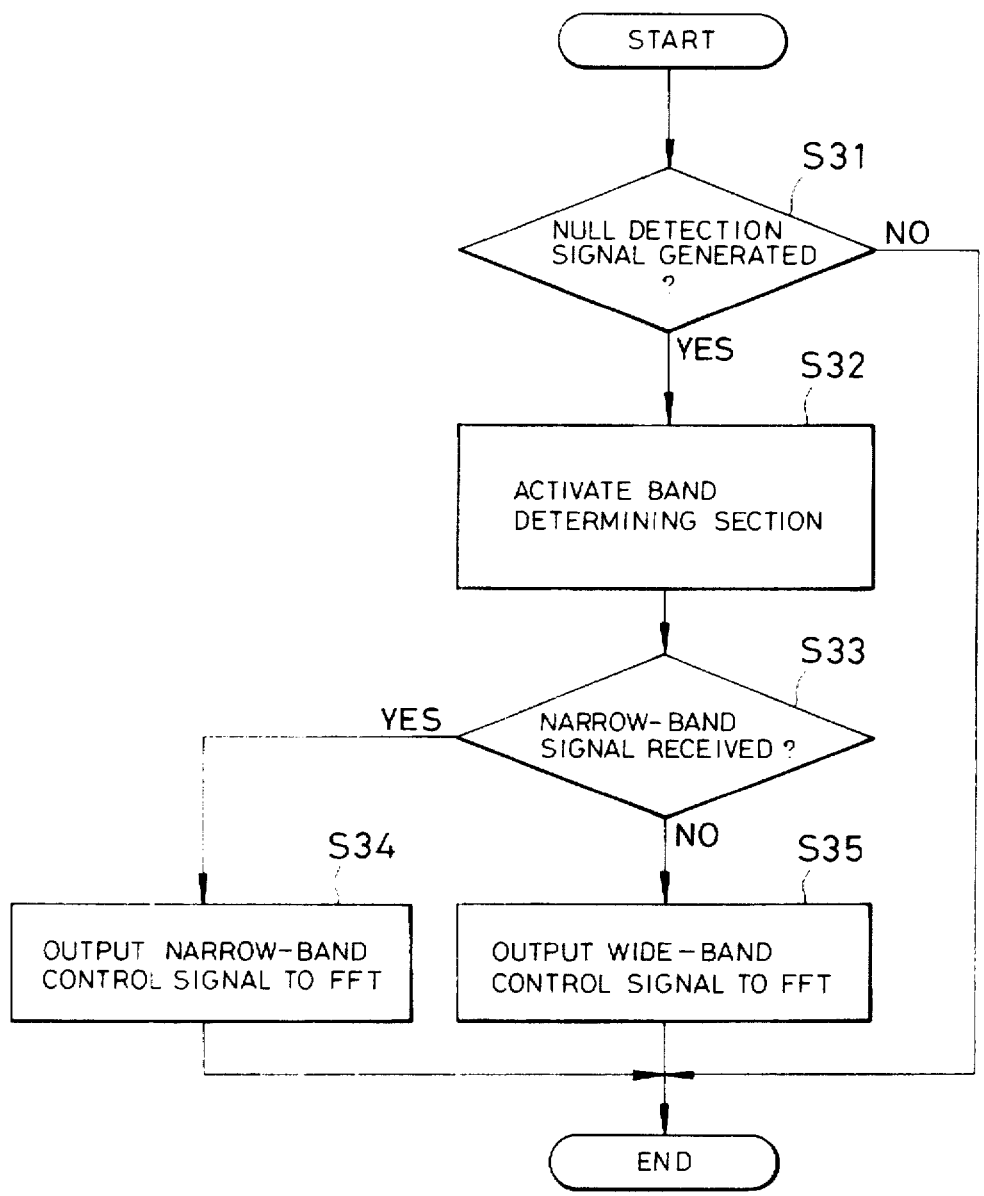
FIG. 10 is a flowchart illustrating the operation of a control section according to the second embodiment of this invention.
Figure 11:
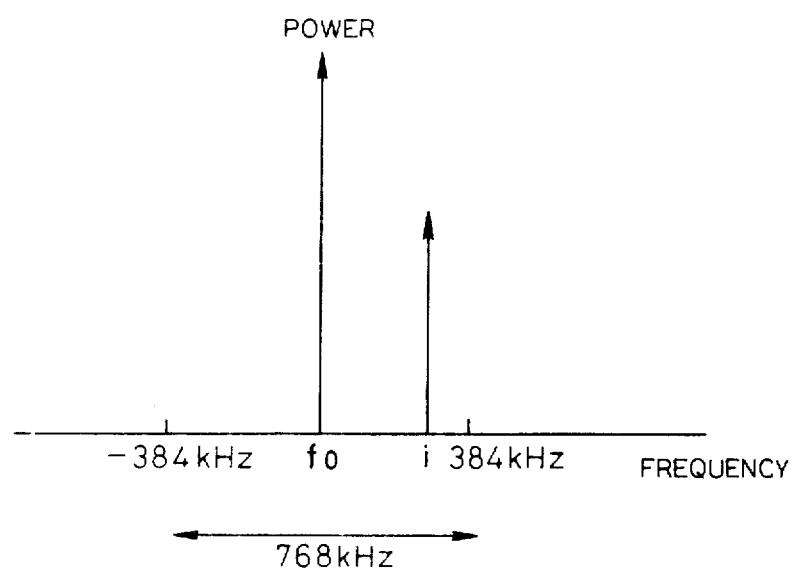
FIG. 11 is a diagram showing the spectrum of the carrier signal of a channel i inserted in a null portion to indicate that the transmission signal is a narrow-band signal.

FIG. 10 shows the operation of the control section 19 according to the second embodiment of the present invention. In this case, signals to be transmitted as broadcast waves from a broadcasting station have the format as shown in FIG. 2 that, for each frame, has the null portion at the head where no signals are present and which is provided for synchronization, followed by the reference signal portion as a phase reference for differential decoding and the data portion. However, a carrier signal having a predetermined level as indicated by a spectrum in FIG. 11 is located only in the i-th (n>i) channel (hereinafter called "channel i") among a plurality of (n) channels (a plurality of carriers) in the null portion in a narrow-band signal as a transmission signal. This channel i corresponds to a frequency in the range with the narrow band width of 768 KHz, e.g., the center frequency $f_o$+200 KHz.

The null detector 21 detects the null portion shown in FIG. 2 from the envelope of the reception signal. More specifically, the null detector 21 computes $I^2+Q^2$ from an in-phase component signal I and an orthogonal component signal Q, acquired from the LPFs 8 and 9, and generates a null detection signal when $I^2+Q^2$ is equal to or below a reference value as the time of the detection of the null portion. This null detection signal is supplied to the control section 19.

The control section 19 discriminates the presence of the null detection signal (step S31), and activates the band determining section 20 when the null detection signal is produced (step S32), as shown in FIG. 10. That is, the control section 19 instructs the band determining section 20 to start the band discriminating operation.

Figure 12:
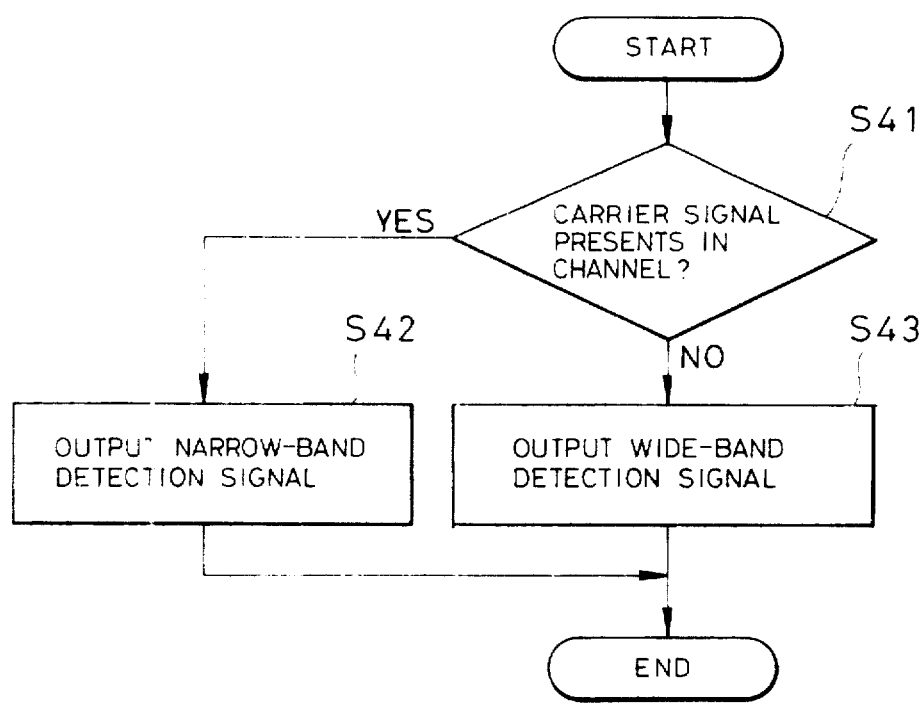
FIG. 12 is a flowchart illustrating the operation of a band determining section.

After starting the operation, the band determining section 20 discriminates if a carrier signal is present in the channel i in the output signal of the FFT 12 within the range of ±384 KHz around the center frequency $f_o$ (step S41), as shown in FIG. 12. When the transmission signal is a narrow-band signal, the band width is 768 KHz and each carrier signal has a frequency within the range of ±384 KHz around the center frequency $f_o$. Further, a carrier signal is present only at the frequency point corresponding to the channel i in the null portion of the narrow-band transmission signal as shown in FIG. 11. When the transmission signal is a wide-band signal, the band width is 1.536 MHz so that a carrier signal is present outside the range of ±384 KHz around the center frequency $f_o$. Further, no signals are present in the null portion. Accordingly, the band determining section 20 determines the presence or absence of a carrier corresponding to the channel i from the FFT result from the FFT 12, and outputs a narrow-band detection signal when there is a carrier (step S42). When there is no carrier signal in the channel i, the band determining section 20 outputs a wide-band detection signal (step S43). The output of the band determining section 20 is held in holding means such as a buffer before being supplied to the control section 19.

After the execution of step S32, the control section 19 discriminates if the reception signal is a narrow-band signal (step S33). This discrimination is determined from the output of the band determining section 20. When the narrow-band detection signal is supplied from the band determining section 20, therefore, the control section 19 outputs a narrow-band control signal to the FFT 12 (step S34). When the wide-band detection signal is supplied from the band determining section 20, which means that the reception signal is not a narrow-band signal, the control section 19 outputs a wide-band control signal to the FFT 12 (step S35). The operation of the FFT 12, when the narrow-band detection signal or the wide-band detection signal has been supplied, is the same as discussed above.

Regardless of whether the reception signal is a wide-band signal or a narrow-band signal, the FFT result in the channel i is output to the band determining section 20.

When the sampling frequency is changed in accordance with the band control signal as mentioned in the foregoing section of the first embodiment, the FFT result in the channel i is output to the band determining section 20 irrespective of whether the reception signal is a wide-band signal or a narrow-band signal.

Figure 13:
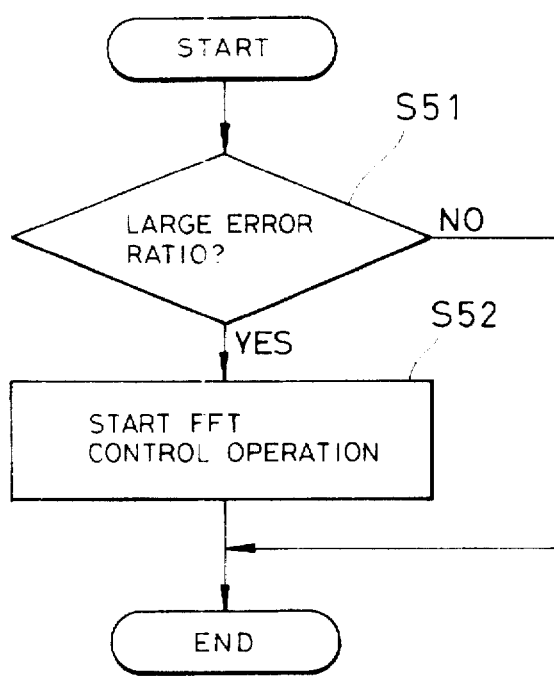
FIG. 13 is a flowchart illustrating the operation of the control section.

The control section 19 need not always execute the FFT control operation in response to the null detection signal, but may perform the operation as follows. The control section 19 determines if the error ratio supplied from the error correcting section 17 is greater than a predetermined value (step S51) at a given timing and executes the FFT control operation illustrated in FIG. 10 when the error ratio is greater than the predetermined value (step S52), as shown in FIG. 13. More specifically, it is assumed that when the error ratio of data acquired in the error correcting section 17 becomes greater than the predetermined value, it is because the processing so far has been carried out, considering that the reception signal were a wide-band signal, even though it was a narrow-band signal. To check it, the control section 19 causes the band determining section 20 to determine the band width of the reception signal. In this way, the band determining section 20 need not always execute the operation, thus reducing the load of a microcomputer when used to constitute the control section 19 and the band determining section 20 as mentioned earlier.

Figure 14:
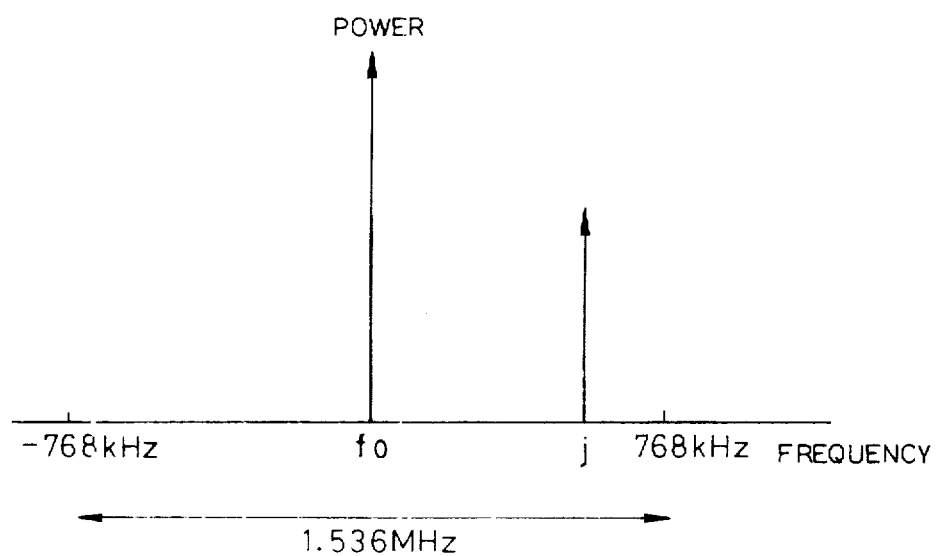
FIG. 14 is a diagram showing the spectrum of the carrier signal of a channel j inserted in the null portion to indicate that the transmission signal is a narrow-band signal.

According to the second embodiment, a carrier signal of a predetermined level is located only at the frequency point corresponding to the channel i in the null portion of a narrow-band signal. However, a carrier signal of a predetermined level may be made to be present only in every specific number of carriers, i.e., in the j-th (n>j) channel (hereinafter called "channel j") among a plurality of (n) channels in the null portion in a wide-band signal as a transmission signal. For example, a carrier signal exists only at the frequency point corresponding to the channel j as indicated by a spectrum in FIG. 14. This channel j corresponds to a frequency outside the range of the narrow band width of 768 KHz and within the range of the wide band width of 1.536 MHz, e.g., the center frequency $f_o$+400 KHz. If a carrier signal is made to be present only in one channel in the null portions of both a narrow-band signal and a wide-band signal and the frequency of the carrier signal in one channel for the wide band is not present in the narrow band width, the band determining section can more surely discriminate whether the reception signal is a narrow-band signal or a wide-band signal.

Although the wide band width is set to 1.536 MHz and the narrow band width is set to 768 KHz in the second embodiment, the band widths are not limited to those particular values, and may be set in accordance with the number of carriers.

Further, according to the second embodiment, it is previously known from which one of the individual channel outputs of the FFT 12 the reception signal with a carrier signal to be inserted in the null portion is output, so that the presence or absence of a narrow-band signal is detected by determining if a carrier signal is present in that channel output. Instead of this approach, frequency signal detection means such as a band-pass filter may actually be used to detect the presence or absence of the carrier signal.

The carrier signal which is to be inserted in the null portion need not be in a single channel, but it may be inserted in a plurality of channels as long as the null portion is clearly distinguished from the other portions.

According to the OFDM broadcast wave receiver of this embodiment, as a broadcast wave is acquired by performing OFDM modulation on a data signal and is transmitted as a signal which has a null portion for each frame, a carrier signal of a specific frequency indicative of the band width of the broadcast wave has been inserted in the null portion before transmission, so that the receiver discriminates if the carrier signal having the specific frequency is present in the null portion of the reception signal and controls the demodulating operation of the demodulation means in accordance with the discrimination result. It is therefore possible to automatically determine whether the received signal is a wide-band signal or a narrow-band signal, thus ensuring the proper signal reception.

Figure 15:
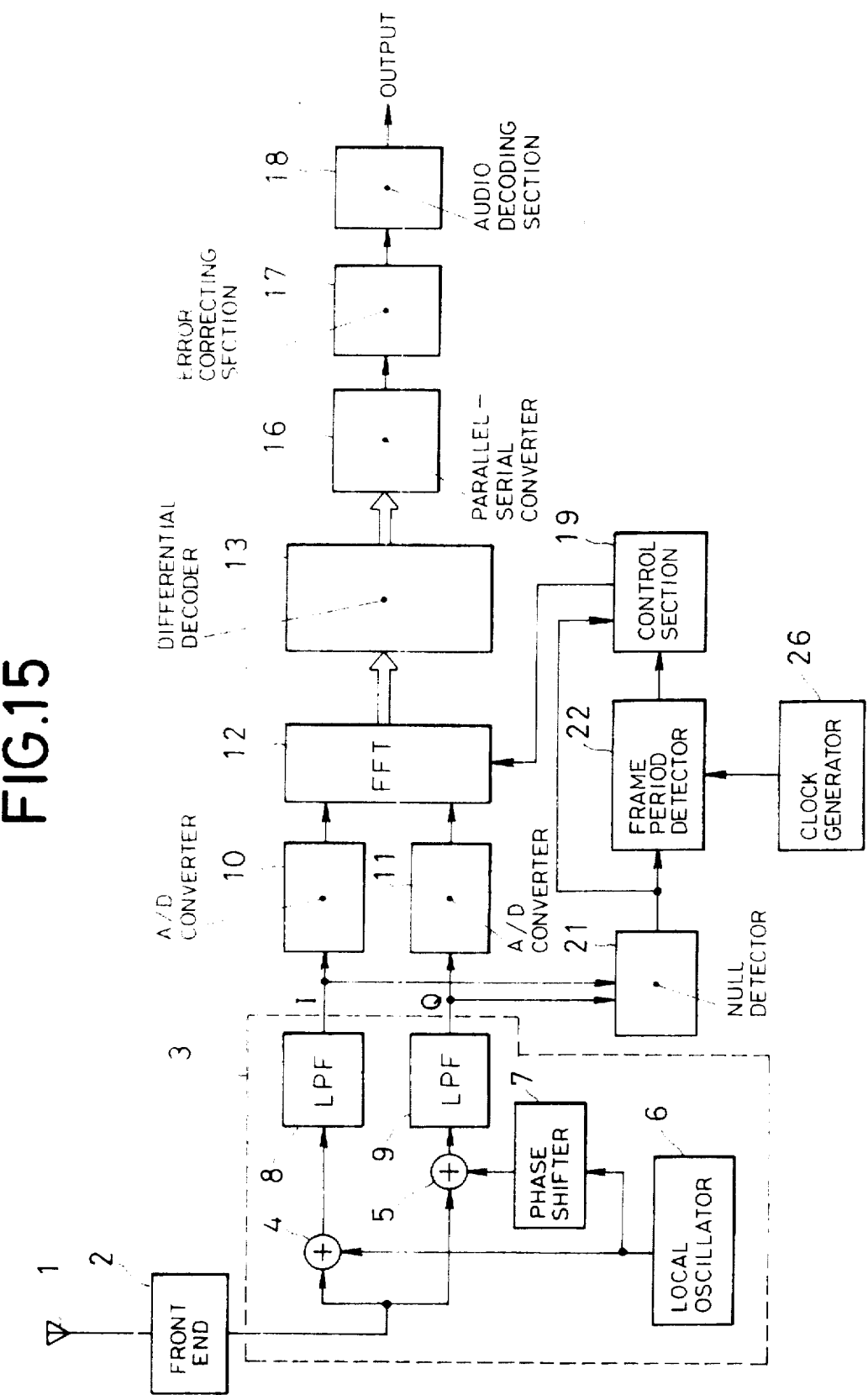
FIG. 15 is a block diagram showing the third embodiment of this invention.
Figure 16:
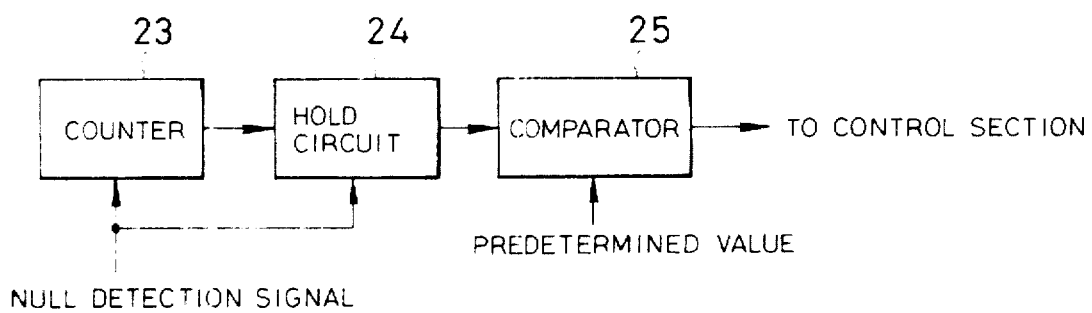
FIG. 16 is a block diagram showing the structure of a frame period detector in the receiver in FIG. 15.

FIG. 15 shows an OFDM broadcast wave receiver according to the third embodiment of the present invention. Like or same reference numerals are given to those components which are the same as the corresponding components of the receiver in FIG. 1. The detection output of the null detector 21 is supplied to the control section 19 and the frame period detector 22. The frame period detector 22 comprises a counter 23, a hold circuit 24 and a comparator 25, as shown in FIG. 16. The counter 23 is reset to return the count value to the initial value (e.g., 0) in response to the null detection signal, and counts the number of clock pulses output from a clock generator 26. The clock pulse from the clock generator 26, though its supply line is not shown in FIG. 15, is used as a sampling clock for the A/D converters 10 and 11. The hold circuit 24 holds the count value of the counter 23 of immediately before the generation of the null detection signal until the next generation of the null detection signal. The comparator 25 compares the count value retained in the hold circuit 24 with a predetermined value, and supplies a signal indicative of the comparison result to the control section 19. In response to the null detection signal, the control section 19 receives the signal indicating the comparison result from the comparator 25 and controls the operation of the FFT 12 in accordance with the received signal, as will be discussed later.

Figure 17:
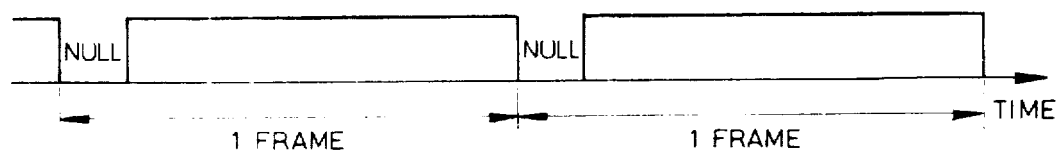
FIG. 17 is a diagram showing the frame length of a wide-band signal.
Figure 18:
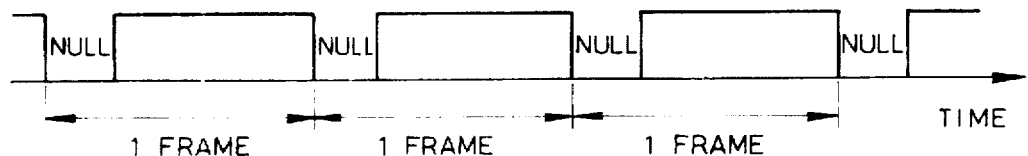
FIG. 18 is a diagram showing the frame length of a narrow-band signal.

Signals to be transmitted as broadcast waves from a broadcasting station have the format as shown in FIG. 2 that, for each frame, has the null portion at the head where no signals are present and which is provided for synchronization, followed by the reference signal portion as a phase reference for differential decoding and the data portion. The length of one frame of a wide-band signal is as shown in FIG. 17, while the length of one frame of a narrow-band signal is shorter than that of a wide-band signal as shown in FIG. 18.

The null detector 21 detects the null portion shown in FIG. 2 from the envelope of the reception signal. More specifically, the null detector 21 computes $I^2+Q^2$ from the in-phase component signal I and the orthogonal component signal Q, acquired from the LPFs 8 and 9, and generates a null detection signal when $I^2+Q^2$ is equal to or below a reference value at the time of the detection of the null portion. As mentioned above, this null detection signal is supplied to the control section 19 and the frame period detector 22.

Because the counter 23 starts counting from the initial value in response to the null detection signal, the count value of the counter 23 of the point immediately before the counter 23 is reset by the null detection signal indicates one frame length. As the count value indicating one frame length is retained in the hold circuit 24, the output signal of the comparator 25, which compares this retained value with a predetermined value, indicates if the current reception signal is a wide-band signal or a narrow-band signal. When the value retained in the hold circuit 24 is greater than the predetermined value, which means that the current reception signal is a wide-band signal, the output signal of the comparator 25 is supplied as the wide-band detection signal to the control section 19. When the value retained in the hold circuit 24 is smaller than the predetermined, which means that the current reception signal is a narrow-band signal, the output signal of the comparator 25 is supplied as the narrow-band detection signal to the control section 19. The predetermined value is set to a value by which the frame length of a wide-band signal can be distinguished from the frame length of a narrow-band signal.

Figure 19:
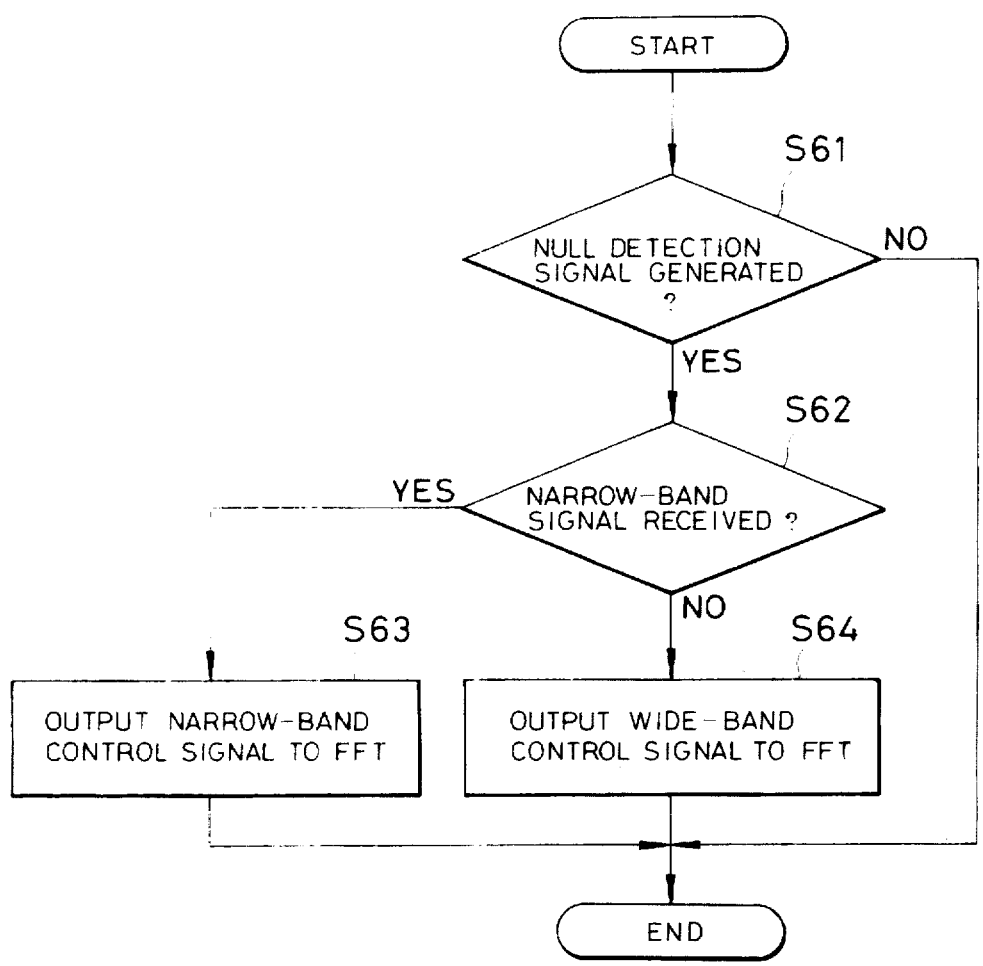
FIG. 19 is a flowchart illustrating the operation of a control section.

The control section 19 discriminates the presence of the null detection signal (step S61), and discriminates if the reception signal is a narrow-band signal when the null detection signal is produced (step S62), as shown in FIG. 19. This discrimination is determined from the output of the comparator 25. When the narrow-band detection signal is supplied from the comparator 25, therefore, the control section 19 outputs the narrow-band control signal to the FFT 12 (step S63). When the wide-band detection signal is supplied from the comparator 25, which means that the reception signal is not a narrow-band signal, the control section 19 outputs the wide-band control signal to the FFT 12 (step S64). The operation of the FFT 12 when the narrow-band control signal or the wide-band control signal is supplied thereto is the same as has been described earlier.

Although the wide band width is set to 1.536 MHz and the narrow band width is set to 768 KHz in the third embodiment, the band widths are not limited to those particular values, but may be set in accordance with the number of carriers.

According to the OFDM broadcast wave receiver of this embodiment, as a broadcast wave is acquired by performing OFDM modulation on a data signal and is transmitted as a frame-by-frame signal and the frame length varies in accordance with the band width of the broadcast wave, so that the receiver discriminates if the frame length of the received signal and controls the demodulating operation of the demodulation means in accordance with the discrimination result. It is therefore possible to automatically determine whether the received signal is a wide-band signal or a narrow-band signal, thus ensuring the proper signal reception.

Figure 20:
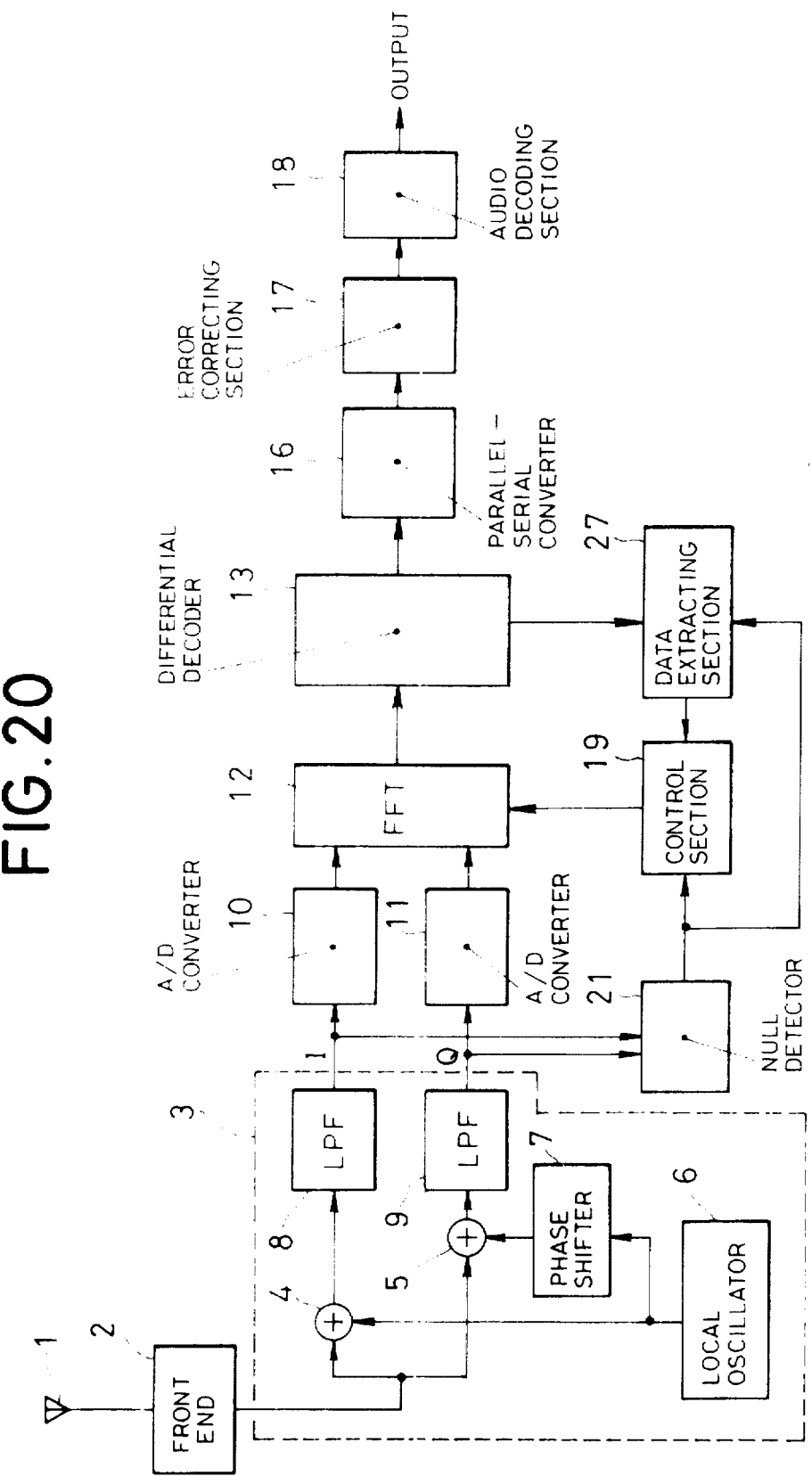
FIG. 20 is a block diagram showing the fourth embodiment of this invention.

FIG. 20 shows an OFDM broadcast wave receiver according to the fourth embodiment of this invention. Like or same reference numerals are given to those components which are the same as the corresponding components of the receiver in FIG. 1. Connected to the detection output of the null detector 21 are the control section 19 and a data extracting section 27. The individual channel outputs of the FFT 12 are also connected to the data extracting section 27. The data extracting section 27 extracts data subjected to differential decoding by the reference signal at the output timing of the null detection signal from the null detector 21, i.e., a CAZAC (Constant Amplifier Zero AutoCorrection) sequence to be discussed later. The data extracted by the data extracting section 27 is retained in holding means such as a buffer before being supplied to the control section 19. In accordance with the null detection signal from the null detector 21 and the data extracted by the data extracting section 27, the control section 19 performs an operation to be discussed later to control the operation of the FFT 12.

Signals to be transmitted as broadcast waves from a broadcasting station have the format as shown in FIG. 2 that, for each frame, has the null portion at the head where no signals are present and which is provided for synchronization, followed by the reference signal portion as a phase reference for differential decoding and the data portion.

As the reference signal, a CAZAC sequence is used. For example, the following Cm is a CAZAC sequence which takes 4 values (1, −1, j, −j) where m is 0 to 15.

Cm: −j, −1, 1, 1, −1, −j, 1, −1, j, 1, 1, 1, 1, j, 1, −1

This CAZAC sequence is a self-orthogonal sequence and has the following property.

$$W_k = \sum_{m=D}^{15} C_m C_{m-k} \bmod 16$$

$$= \begin{cases} 16 \ (k=0) \\ 0 \ (k \neq 0) \end{cases}$$

The self-correlation with the shifted sequence therefore becomes 0.

Let this CAZAC sequence Cm be a CAZAC sequence C0. Then, the other three CAZAC sequences can be acquired from this CAZAC sequence C0, so that a total of four CAZAC sequences C0, C1, C2 and C3 can be produced. The CAZAC sequences C1, C2 and C3 are as follows.

C1=jC0, C2=−C0, C3=−jC0

By performing differential coding on the data of the CAZAC sequences C0, C1, C2 and C3, four training sequences X0, X1, X2 and X3 are produced, which are treated as the reference signals. In executing differential coding on data adjacent to C0, X0 is obtained as follows.

C0={$C_{00}, C_{01}, \ldots, C_{015}$}

X0={$C_{00}*C_{01}, C_{01}*C_{02}C_{02}*C_{03}, \ldots C_{015}*C_{00}$}

As the differential decoder 13 of the receiver performs differential decoding on the four training sequences X0 to X3, the CAZAC sequences C0 to C3 are acquired. In accordance with the CAZAC sequences C0 to C3, the frequency axis offset and time axis offset are conducted.

Suppose that the CAZAC sequence for producing the aforementioned four training sequences X0, X1, X2 and X3 is CAZAC1 indicating a wide-band transmission signal and the CAZAC sequence for producing the other training sequences is CAZAC2 defining a narrow-band signal.

As a narrow-band transmission signal has a band width of 768 KHz as shown in FIG. 4, and each carrier signal has a frequency within the range of ±384 KHz from the center frequency $f_o$, there are no signals, except noise, in the guard band a between the band of the signal of 1 to be received and the adjoining signal band. As a wide-band transmission signal has a band width of 1.536 MHz as shown in FIG. 5, carrier signals are present outside the range of ±384 KHz.

The null detector 21 detects the null portion shown in FIG. 2 from the envelope of the reception signal. More specifically, the null detector 21 computes $I^2+Q^2$ from the in-phase component signal I and the orthogonal component signal Q, acquired from the LPFs 8 and 9, and generates a null detection signal when $I^2+Q^2$ is equal to or below a reference value as the time of the detection of the null portion. This null detection signal is supplied to the control section 19 and the data extracting section 27.

Figure 21:
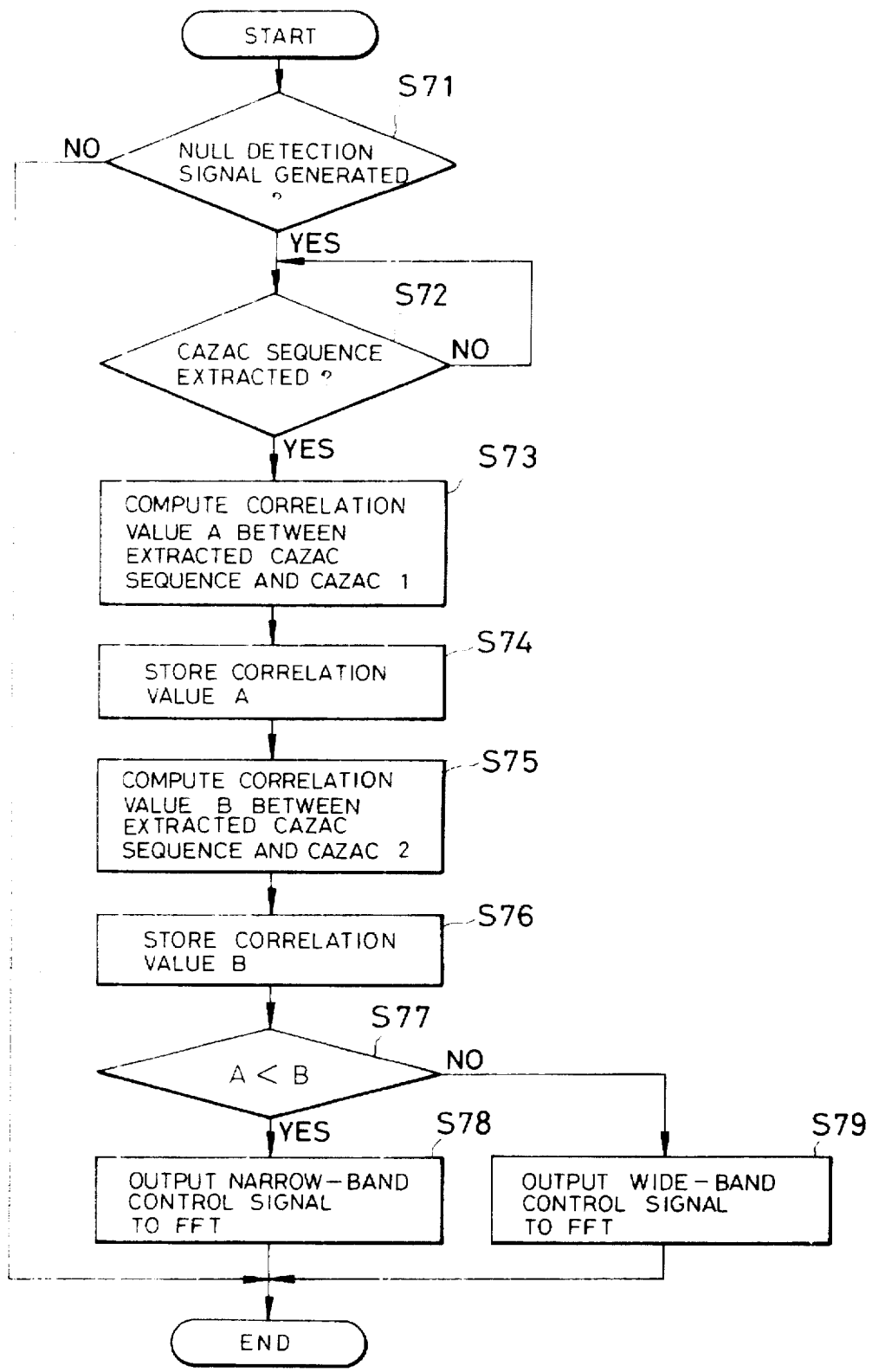
FIG. 21 is a flowchart illustrating the operation of a control section.

The control section 19 discriminates the presence of the null detection signal (step S71), and discriminates if the data extracting section 27 has extracted a CAZAC sequence (step S72) when the null detection signal exists, as shown in FIG. 21. The data extracting section 27 extracts a CAZAC sequence from the data which has undergone differential decoding in the differential decoder 13 at the output timing of the null detection signal from the null detector 21. When it is determined that the CAZAC sequence has been discriminated from the output of the data extracting section 27, a correlation value A between the extracted CAZAC sequence and a CAZAC sequence (CAZAC1) corresponding to a wide band is computed (step S73), and this correlation value A is stored in an internal memory (not shown) (step S74). Further, a correlation value B between the extracted CAZAC sequence and a CAZAC sequence (CAZAC2) corresponding to a narrow band is computed (step S75), and this correlation value B is stored in the internal memory (step S76). Then, the correlation values A and B are compared with each other (step S77), and the comparison result becomes the band detection signal. When A<B, it is determined that a narrow-band signal has been received and the narrow-band control signal is output to the FFT 12 (step S78). When A≧B, however, it is determined that a wide-band signal has been received and the wide-band control signal is output to the FFT 12 (step S79). The operation of the FFT 12 when the narrow-band detection signal or the wide-band detection signal is supplied thereto is the same as described earlier.

Although the data extracting section 27 extracts a CAZAC sequence from the data which has undergone differential decoding in the differential decoder 13 at the output timing of the null detection signal in the fourth embodiment, the data extraction method is not limited to this particular type. For example, differential coding on the CAZAC1 might have been performed between adjacent channels and differential decoding on the CAZAC2 might have been performed between every other channels in the transmitter. The receiver may extract a CAZAC sequence (first CAZAC sequence), which is acquired by performing differential decoding between adjacent channels or performing differential decoding by the reference signal by supplying the output of a delay element of the channel i (i<n) to a multiplier of the channel i−1, and a CAZAC sequence (second CAZAC sequence), which is acquired by performing differential decoding between every other channels or by performing differential decoding by the reference signal by supplying the output of the delay element of the channel i (i<n) to a multiplier of the channel i−2. In this case, the control section 19 should compare the correlation values of the first and second CAZAC sequences with respective predetermined CAZAC sequences, would determine the reception signal is a wide-band signal when the correlation value for the first CAZAC sequence is equal to or greater than the correlation value for the second CAZAC sequence, and would determine the reception signal is a narrow-band signal when the latter correlation value is greater than the former correlation value. In this case, the same CAZAC sequence may be used for both the CAZAC1 and CAZAC2.

It is also possible to determine if the reception signal is a wide-band signal or a narrow-band signal if a wide-band signal is set in the order of the training sequences X0, X1, X2 and X3 and a narrow-band signal is set in the order of the training sequences X3, X2, X1 and X0. Supposing that the CAZAC sequences obtained from the transmission signal are Ca, Cb, Cc and Cd in this case, the determination of the type of the reception signal can be made by the correlation of those CAZAC sequences with the set sequences. As C1, C2 and C3 can be produced from C0, C0 may be produced for a wide band based on C1=jC0 from Cb where C1 is arranged, the correlation values of Ca where C0 is arranged and Cb with the associated, set sequence may be computed from C0, and the individual correlation values may likewise be computed for a narrow band, so that the discrimination of the type of the reception signal can be made by comparing the acquired correlation values with each other.

Although the correlation values A and B are obtained and the band width is discriminated based on the result of the comparison of the correlation values A and B with each other in the fourth embodiment, only one of the correlation values (A or B) may be obtained from which the band width is discriminated.

Although the reference signal has a CAZAC sequence in the fourth embodiment, the reference signal may not be limited to this particular type but may show another sequence which can ensure band discrimination.

Although the foregoing description of the fourth embodiment has discussed the band width as the predetermined identification parameter of a broadcast wave, the predetermined identification parameter is not be limited to the band width. For example, other identification parameters such as a broadcasting station or a transmitter may be used as well.

According to the fourth aspect of this invention, a broadcast wave is acquired by performing OFDM modulation on a data signal and is transmitted as a signal having a reference signal for differential demodulation for each frame, the predetermined identification parameter, such as the band width, of the broadcast wave is described in the reference signal in a detectable form, and the receiver extracts a signal corresponding to the reference signal and to be subjected to OFDM demodulation from the output signal of the demodulation means, discriminates if the extracted signal is a signal indicative of a specific content in the predetermined identification parameter and controls the demodulating operation of the demodulation means in accordance with the discrimination result. It is therefore possible to automatically determine whether the received signal is a wide-band signal or a narrow-band signal, thus ensuring the proper signal reception.

What is claimed is:

1. An OFDM (Orthogonal Frequency Division Multiplex) broadcast wave receiver comprising:

tuning means for selectively extracting a signal having a desired frequency as a reception signal from high frequency signals from an antenna;

demodulation means for performing OFDM demodulation on said reception signal to acquire signals each of which has one of a plurality of frequencies;

band detection means for detecting a band width of said reception signal and generating a band detection signal indicative of said band width; and control means for controlling a demodulation operation of said demodulation means in accordance with said band detection signal, wherein said band detection means discriminates if there is a carrier signal having a predetermined frequency among said plurality of frequencies and outputs the discrimination result as said band detection signal.

2. The OFDM broadcast wave receiver according to claim 1, wherein said demodulation means includes:

orthogonal demodulation means for performing orthogonal demodulation on said reception signal to produce an in-phase component and an orthogonal component of a base-band signal;

A/D (Analog/Digital) conversion means for performing A/D conversion of said in-phase component and said orthogonal component separately; and fast Fourier transform means for performing fast Fourier transform on an output signal of said A/D conversion means and outputting signals each of which has one of said plurality of frequencies, said fast Fourier transform means being able to alter an output range of said plurality of frequencies in accordance with said band detection signal.

3. The OFDM broadcast wave receiver according to claim 2, wherein said fast Fourier transform means alters a sampling frequency in accordance with said band detection signal.

4. The OFDM broadcast wave receiver according to claim 1, wherein said reception signal has a signal format consisting of a null portion, a reference signal portion and a data portion in order for each frame, and said control means has detection means for generating a null detection signal upon detection of said null portion and controls said demodulation operation in response to said null detection signal.

5. An OFDM (Orthogonal Frequency Division Multiplex) broadcast wave receiver for receiving a broadcast wave, acquired by performing OFDM modulation on a data signal and transmitted as a signal having a null portion for each frame, said receiver comprising:

tuning means for selecting a signal having a desired frequency as a reception signal from high frequency signals from an antenna;

demodulation means for performing OFDM demodulation on said reception signal to acquire signals each of which has one of a plurality of frequencies;

band detection means for detecting a band width of said reception signal and generating a band detection signal indicative of said band width; and control means for controlling a demodulation operation of said demodulation means in accordance with said band detection signal, wherein said band detection means discriminates if a carrier signal having a specific frequency is present in said null portion of said reception signal and outputs the discrimination result as said band detection signal.

6. The OFDM broadcast wave receiver according to claim 5, wherein presence of said carrier signal having said specific frequency in said null portion is set in accordance with a band width of said broadcast wave.

7. The OFDM broadcast wave receiver according to claim 5, further comprising null detection means for generating a null detection signal upon detection of said null portion, and wherein said band detection means executes an operation of detecting presence of said carrier signal having said specific frequency in said null portion in response to said null detection signal.

8. The OFDM broadcast wave receiver according to claim 5, wherein said demodulation means includes:

orthogonal demodulation means for performing orthogonal demodulation on said reception signal to produce an in-phase component and an orthogonal component of a base-band signal;

A/D (Analog/Digital) conversion means for performing A/D conversion of said in-phase component and said orthogonal component separately; and fast Fourier transform means for performing fast Fourier transform on an output signal of said A/D conversion means and outputting signals each of which has one of said plurality of frequencies, said fast Fourier transform means being able to alter an output range of said plurality of frequencies in accordance with said band detection signal.

9. The OFDM broadcast wave receiver according to claim 8, wherein said fast Fourier transform means alters a sampling frequency in accordance with said band detection signal.

10. An OFDM (Orthogonal Frequency Division Multiplex) broadcast wave receiver for receiving a broadcast wave, acquired by performing OFDM modulation on a data signal and transmitted as a frame-by-frame signal, said receiver comprising:

tuning means for selecting a signal having a desired frequency as a reception signal from high frequency signals from an antenna;

demodulation means for performing OFDM demodulation on said reception signal to acquire signals each of which has one of a plurality of frequencies;

band detection means for detecting a band width of said reception signal and generating a band detection signal indicative of said band width; and control means for controlling a demodulation operation of said demodulation means in accordance with said band detection signal, wherein said band detection means discriminates a frame length of said reception signal and outputs the discrimination result as said band detection signal.

11. The OFDM broadcast wave receiver according to claim 10, wherein said frame length differs in accordance with a band width of said broadcast wave.

12. The OFDM broadcast wave receiver according to claim 10, wherein said reception signal has a signal format having a null portion, a reference signal portion and a data portion in order for each frame, and said control means includes detection means for generating a null detection signal upon detection of said null portion, counting means for counting an interval of occurrence of said null detection signal and comparing means for comparing a count value of said counting means with a predetermined value.

13. The OFDM broadcast wave receiver according to claim 10, wherein said demodulation means includes:

orthogonal demodulation means for performing orthogonal demodulation on said reception signal to produce an in-phase component and an orthogonal component of a base-band signal;

A/D (Analog/Digital) conversion means for performing A/D conversion of said in-phase component and said orthogonal component separately; and fast Fourier transform means for performing fast Fourier transform on an output signal of said A/D conversion means and outputting signals each of which has one of said plurality of frequencies, said fast Fourier transform means being able to alter an output range of said plurality of frequencies in accordance with said band detection signal.

14. The OFDM broadcast wave receiver according to claim 13, wherein said fast Fourier transform means alters a sampling frequency in accordance with said band detection signal.

15. An OFDM (Orthogonal Frequency Division Multiplex) broadcast wave receiver for receiving a broadcast wave, acquired by performing OFDM modulation on a data signal and transmitted as a signal having a reference signal for differential demodulation for each frame, said receiver comprising:

tuning means for selecting a signal having a desired frequency as a reception signal from high frequency signals from an antenna;

demodulation means for performing OFDM demodulation on said reception signal to acquire signals each of which has one of a plurality of frequencies;

identification parameter detection means for detecting a predetermined identification parameter relating to said broadcast wave and generating an identification detection signal indicative of a content of said predetermined identification parameter; and control means for controlling a demodulation operation of said demodulation means in accordance with said identification detection signal, wherein said identification parameter detection means includes means for extracting a signal corresponding to said reference signal from an output signal of said demodulation means, and discrimination means for discriminating if said extracted signal is a signal indicative of a specific content in said predetermined identification parameter and outputting the discrimination result as said identification detection signal.

16. The OFDM broadcast wave receiver according to claim 15, wherein said reference signal is a signal obtained by differential coding of a CAZAC (Constant Amplifier Zero AutoCorrection) sequence which differs in accordance with said predetermined identification parameter.

17. The OFDM broadcast wave receiver according to claim 15, wherein said reference signal is a signal obtained by differential coding of a CAZAC (Constant Amplifier Zero AutoCorrection) sequence in different frequencies among said plurality of frequencies in accordance with said predetermined identification parameter.

18. The OFDM broadcast wave receiver according to claim 15, wherein said reference signal is a signal obtained by setting a sequence acquired by differential coding of a CAZAC (Constant Amplifier Zero AutoCorrection) sequence in accordance with said predetermined identification parameter.

19. The OFDM broadcast wave receiver according to claim 15, wherein said demodulation means includes:

orthogonal demodulation means for performing orthogonal demodulation on said reception signal to produce an in-phase component and an orthogonal component of a base-band signal;

A/D conversion means for performing A/D (Analog/Digital) conversion of said in-phase component and said orthogonal component separately;

fast Fourier transform means for performing fast Fourier transform on an output signal of said A/D conversion means and outputting signals each of which has one of said plurality of frequencies, said fast Fourier transform means being able to alter an output range of said plurality of frequencies in accordance with said identification detection signal; and differential decoding means for performing differential decoding of an output signal of said fast Fourier transform means.

20. The OFDM broadcast wave receiver according to claim 19, wherein said fast Fourier transform means alters a sampling frequency in accordance with said identification detection signal.

* * * * *